United States Patent [19]

Hausler

[11] 3,881,957
[45] May 6, 1975

[54] ELECTROCHEMICAL CELL COMPRISING A CATALYTIC ELECTRODE OF A REFRACTORY OXIDE AND A CARBONACEOUS PYROPOLYMER

[75] Inventor: Rudolf H. Hausler, Palatine, Ill.

[73] Assignee: Universal Oil Products Company, Des Plaines, Ill.

[22] Filed: July 2, 1973

[21] Appl. No.: 375,984

Related U.S. Application Data

[63] Continuation-in-part of Ser. No. 235,772, March 17, 1972, abandoned.

[52] U.S. Cl.......... 136/86 D; 136/120 FC; 136/127; 317/230; 252/62.3 Q; 117/216; 117/217; 117/226; 252/502; 252/503; 252/506; 252/508; 204/290
[51] Int. Cl............................................ H01m 27/04
[58] Field of Search 136/86 D, 86 F, 86 R, 120 FC, 136/120, 121–122, 89; 252/62.3 Q, 502, 508, 503, 506; 317/230, 234 S, 242; 117/215–218, 226; 106/56; 204/290

[56] References Cited
UNITED STATES PATENTS

| | | |
|---|---|---|
| 1,900,018 | 3/1933 | Lilienfeld................ 317/235 B |
| 3,039,897 | 6/1962 | Waring et al..................... 117/226 |
| 3,513,029 | 5/1970 | Giner et al......................... 136/86 D |
| 3,530,006 | 9/1970 | Makishima et al. .............. 136/86 D |
| 3,634,113 | 1/1972 | Fehrenbacher............... 136/86 D X |

OTHER PUBLICATIONS

Pohl, "Semiconduction in Polymers," Organic Semiconductors, Brophy et al., Eds., (Macmillan, N.Y. Pub.), 1962; pp. 134; 138–140.

Primary Examiner—Anthony Skapars
Attorney, Agent, or Firm—James R. Hoatson, Jr.; Raymond H. Nelson; William H. Page, II

[57] ABSTRACT

An electrochemical cell having a catalytic electrode which is comprised of a refractory oxide having a surface area from 1 to 500 square meters per gram, and a carbonaceous pyropolymer forming at least a monolayer of said refractory oxide, said electrode having a conductivity at room temperature of from $10^{-8}$ to $10^0$ inverse ohm-centimeters.

16 Claims, 4 Drawing Figures

ELECTROCHEMICAL CELL COMPRISING A CATALYTIC ELECTRODE OF A REFRACTORY OXIDE AND A CARBONACEOUS PYROPOLYMER

CROSS-REFERENCE TO RELATED APPLICATIONS

This application is a continuation-in-part of my co-pending application Ser. No. 235,772 filed Mar. 17, 1972, now abandoned.

This invention relates to an electrode for an electrochemical cell as described in U.S. Pat. No. 3,651,386.

An electrochemical cell is basically comprised of an anode and a cathode positioned in an electrolyte and connected in an external circuit, although many variations of the physical arrangement of the three components are possible. An electrochemical cell is a device which permits the performance of oxidation or reduction reactions electrochemically, that is by way of an electron transfer reaction at an electrode electrolyte interface. Oxidation reactions take place at the anode while reduction reactions take place at the cathode.

Electrochemical cells can be classified according to their use. Some produce energy and are called batteries. Others are used to produce chemicals under the use of energy and are called electrolysis cells.

There are a great many different types of energy producing electrochemical cells, such as primary batteries, secondary batteries, fuel cells and batteries which are combinations where one electrode may be a fuel cell electrode, the other a conventional battery electrode, such as is the case in the zinc-air battery.

If the cell is a fuel cell, fuel is supplied from an external source to the anode where it is oxidized, thereby freeing electrons which flow in the external circuit. The oxidation of the fuel also results in the production of hydrogen ions at the anode. These hydrogen ions pass through the electrolyte to the cathode, where they combine with oxygen and electrons to form water. Electrodes of a fuel cell may be of the diffusion type, and usually are porous and have at least one surface impregnated with a catalyst, such as the catalyst substance of this invention. Chemical and catalytic action takes place only at the interface between the electrolyte, the reacting gas, and an electrode.

As it is desirable to design an electrochemical cell so as to increase the surface of this interface, the electrodes are often constructed with at least one surface of a porous material and with a hollow interior. The reacting fuel gas and the oxygen is forced into the interior of the pores of the respective electrodes where the gases meet the electrolyte. The electrochemical reactions take place at a three phase boundary area. It is at this boundary area of the anode or cathode that oxidation of the fuel and reduction of the oxygen takes place, thereby producing electricity in the external circuit, and it is this boundary area that has to have catalytic activity.

Fuel cells are often classified on the basis of their mode of operation. Typical high temperature fuel cells which operate at 800° to 1200° C. use solid electrolytes and gaseous fuels. Molten salt electrolytes are used in fuel cells operating at temperatures from 400° to 800° C. They use gaseous fuels also. Low temperature fuel cells operate at temperatures from ambient to 200° or 300° C. use liquid, dissolved or gaseous fuels. The oxidizing agent in most fuel cells is air, although others such as chlorine gas may be used as well. The range of available fuels is much larger. Examples are hydrogen, alcohols, hydrazine, hydrocarbons, and many more. The power which can be obtained from a battery is given by the current which can be drawn under a given voltage. It is characteristic of all chemical energy conversion devices that the voltage difference between the anode and cathode decreases as the current goes up. This voltage decrease is called polarization. Since one always attempts to obtain highest power output possible, one is constantly striving to reduce the polarization of the fuel cell electrodes. This is achieved by increasing the temperature of operation or by the use of an electrocatalyst such as in claimed in this invention.

The electrodes are often composed of a structural base section and a catalyst material mounted on the base. The structural base section usually takes the form of conductive screens or gauzes. The electrode is held in place by an electrically conductive holder having an opening. It is upon this opening that the electrode is mounted. The holder is made of electroconductive material, such as copper, silver, carbon and the like. The holder is directly conducted to the electric terminal of the external circuit and is hollow with an inlet opening through which fuel or oxygen (air) may be supplied to one side of the electrode. The electrode assembly is located below the surface of the electrolyte such that the other surface of the electrode is in contact with this electrolyte.

A typical gas diffusion electrode used in the manner described above permits the fuel gas or oxygen or air to diffuse into the interior of the pores of the electrode from one side while the electrolyte penetrates the pores from the electrolyte side. In this manner, an extended area or interface for three phase contact is achieved.

This is often brought about by incorporating a certain hydrophobicity into the electrolyte by compacting the catalyst material with a hydrophobic powderous plastic material or by such techniques as spraying one surface with a solution of Teflon, oil, or other polymeric materials, or any other suitable means. Appropriate plastic polymers include porous polytetrafluoro-ethylene, porous polyethylene, porous polyurethane foams, polystyrene, cellophane, polyvinylidene chloride, polyvinyl chloride, polyvinyl ethyl ether, polyvinyl alcohol, polyvinyl acetate, polypropylene cellulose, polymethyl methacrylate, butadiene-styrene copolymers, styrenated alkyd resins, some poly-epoxide resins, and chlorinated rubber.

The success of an electrochemical cell using a catalyst is fundamentally measured by the cost of producing electricity in the cell. Factors which are determinative of this cost include the temperature at which for example a fuel cell must be maintained during operation, the coulombic efficiency at which the fuel is oxidized, the cost of the fuel used, the cost of the catalyst used, and the life or stability of the catalyst, and finally the thermodynamic efficiency.

An important object of fuel cell development is to obtain high discharge voltage at current rates which produce a good watt/pound ratio. This can be achieved if the current-voltage characteristic of the electrode is close to the theoretical Tafel slope and exhibits a minimum of over-voltage.

Thus, it is an object of this invention to provide an electrode material for an electrochemical cell which will efficiently catalyze cathodic or anodic reactions. Another object of this invention is to provide an electrode material for an electrochemical cell that exhibits a minimum of overvoltage and approaches a theoretical Tafel slope.

In a broad aspect the present invention provides for an electrode in an electrochemical cell comprising refractory oxide having a surface area from 1 to 500 square meters per gram, and a carbonaceous pyropolymer forming at least a monolayer on said refractory oxide, said electrode having a conductivity at room temperature of from $10^{-9}$ to $10^0$ inverse ohm-centimeters.

There are several methods for preparing the electrode material for the electrochemical cell of this invention. One preferred method includes heating the refractory oxide to a temperature of from at least 500° to 1000° C. in an atmosphere containing an organic pyrolyzable substance. Another method comprises heating a metallically promoted refractory oxide having a surface area of from about 1 to about 500 square meters per gram to a temperature of from at least 400° to 1000° C. in an atmosphere containing an organic pyrolyzable substance. The organic pyrolyzable substances most commonly and preferably used for the purposes of this invention are members of the group consisting of aliphatic hydrocarbons, aliphatic halogen derivatives, aliphatic oxygen derivatives, aliphatic sulphur derivatives, aliphatic nitrogen derivatives, organo-metallic compounds, alicyclic compounds, aromatic compounds, and heterocyclic compounds. Of the aliphatic hydrocarbons, the more common classes which may be utilized to perform this invention are alkanes, alkenes, alkynes, and alkadines. Ethane, propane, butane, and pentane are among the alkanes that may be successfully used in the performance of this invention. Similarly, alkenes which suffice include ethene, propene, 1-butene, 2-butene, and 1-pentene. Alkynes which may be successfully used include ethyne, propyne, 1-butyne, 2-butyne, 1-pentyne, and 1-hexyne. 1,3-butadiene and isoprene are included among the alkadienes which may be utilized. Among the aliphatic halogen derivatives which suffice for the purposes of this invention are monoalkanes, polyhaloalkanes, and unsaturated halo compounds. In the monoalkane subgroup, chloromethane, bromoethane, 1-iodopropane, and 1-chlorobutane may be used. Polyhaloalkanes such as carbon tetrachloride, chloroform, 1,2-dichloroethane, and 1,2-dichlorobutane may also be utilized. One unsaturated halo compound which may be utilized is chloroprene.

The aliphatic oxygen derivatives appropriate for use in this invention include the classes of alcohols, ethers, halohydrides and alkene oxides, saturated aldehydes and ketones, unsaturated aldehydes and ketones, ketenes, acids, esters, salts and carbohydrates. Various alcohols which may be utilized include ethanol, 2-butanol, 1-propanol, glycol (e.g., 1,3-propanediol), and glycerol. Ethers utilized include ethyl ether, and isopropyl ether. Appropriate halohydrins and alkene oxides include ethylene chlorohydrin, propylene chlorohydrin, ethylene oxide, and propylene oxide. Suitable saturated aldehydes and ketones include formaldehyde, acetaldehyde, acetone, and ethyl methyl ketone. Unsaturated aldehydes and ketones which may be used include propenol, trans-2-butenal, and butenone. Ketene has also been successfully used as an organic pyrolyzable substance. Likewise, formic acid, acetic acid, oxalic acid, acrylic acid, chloroethanoic acid, formic anhydride, and formylchloride may also be utilized. Esters such as methyl formate, ethyl formate, and ethyl acetate may also be used. Salts such as sodium formate, potassium acetate, and calcium propionate may be utilized as may a variety of carbohydrates. The broad classification of aliphatic sulfur derivatives may be broken down into the subclasses of alkanethiols, alkylthioalkanes, sulfonic acids, and alkyl sulfates and alkyl metallic sulfates. Suitable among the alkanethiols are ethyl mercaptan and n-propyl mercaptan. Among the alkylthioalkanes usable are the thioethers, alkyl sulfides, methy sulfide, ethyl sulfide, and methyl propyl sulfide. Ethyl sulfonic acid and n-propyl sulfonic acid are sulfonic acids which also may be successfully used. Ethyl sulfate and sodium laurel sulfate are also appropriate for use.

The broad class of aliphatic nitrogen derivatives may be broken down into the subclasses of nitroalkanes, amides, amines, nitriles, and carbylamines. Nitroethane and 1-nitropropane are exemplary of suitable nitroalkanes while acetamide and propioamide are among the appropriate amides. Amines such as dimethylamine and ethylmethylamine, nitriles such as acetonitrile and propionitrile, and carbylamines such as ethyl isocyanid may also be used for the organic pyrolyzable substance in this invention. Organo-metallic compounds such as tetraisopropyl titanate, tetrabutyl titanate, and 2-ethylhexyl titanate may also be used.

Particularly appropriate and preferred for use as the organo pyrolyzable substance of this invention are the alicyclic compounds. Foremost among these are cyclohexane and cyclohexene. Aromatic compounds include the subclasses of hydrocarbons, halogen compounds, oxygen derivatives, ethers, aldehydes, ketones, quinones, aromatic acids, aromatic sulfur derivatives, and aromatic nitrogen compounds may also be utilized. Among the many suitable hydrocarbons, benzene, naphthalene, anthracene, and toluene were successfully utilized. Benzyl chloride and benzal chloride are appropriate halogen compounds while phenol, o-cresol, benzyl alcohol and hydroquinone are among the suitable derivatives. Ethers such as anisole and phenetole and aldehydes, ketones and quinones, such as benzladehyde, acetophenone, benzophenone, benzoquinone, and anthraquinone may also be used. Aromatic acids such as benzoic acid, phenylacetic acid, and hydrocinnamic acid may be utilized while the aromatic sulfur derivative of benzene sulfonic acid will also serve successfully. The aromatic nitrogen compounds of nitrobenzene, 1-nitronaphthalene, amino-benzene, and 2-amine toluene may also be successfully used as the organic pyrolyzable substance of this invention. Among the heterocyclic compounds, five member ring compounds such as furan, proline, coumarone, thionaphthene, indole, indigo, and carbazole may be successfully utilized. Six member ring compounds such as pyran, coumarin and acridine may also be utilized.

As can be seen, an extremely wide latitude can be exercised in the selection of the organic pyrolyzable substance, since virtually any organic material that can be vaporized, decomposed and polymerized on the refractory oxide by heating will suffice.

It has been found that the specific carbon concentration corresponding to a particular conductivity is a function of the pyrolyzable substance used to build the carbonaceous pyropolymer. For example, a carbon concentration of 31.7 percent in the pyropolymer produced from cyclohexane results in a conductivity of about $4\times10^{-3}$ inverse ohm-centimeters, while a carbon concentration of 21.1 percent in the pyropolymer produced from benzene results in a conductivity of about $4\times10^{-2}$ inverse ohm-centimeters. This indicates a difference in the pyropolymer structure as between the pyropolymers produced from different pyrolyzable substances. This difference is due to organic residues not included in the extended, conjugated double-bond structure. Such a difference indicates that extraneous carbon structures may be eliminated from the pyropolymer by a proper choice of starting materials. One particularly advantageous choice is a mixture of benzene and o-xylene. Demethylation of the xylene to produce the benzyl radical or diradical promotes the formation of large aromatic polynuclear networks without extraneous, non-conjugated network elements by providing a large concentration of nucleation radicals. This results in an organic semi-conducting material having a high conductivity with a relatively low carbon concentration. Similar results can be achieved using mixtures of o-xylene and naphthalene, o-xylene and anthracene, and halogenated or dihalogenated benzene and benzene, naphthalene or anthracene.

Reference to the following drawing and accompanying description thereof will serve to more fully describe the present invention as well as to set forth additional advantageous features thereof.

DESCRIPTION OF THE DRAWING

Referring now to FIG. 1, there is shown a quartz vessel 1' within which a bed of refractory oxide spheres 10 is positioned. While the refractory oxide of FIG. 1 is illustrated in the form of spheres 10, the refractory oxide may be utilized in virtually any form. Some of the many forms of refractory oxide which may be rendered semi-conducting include loose or compacted dry powders, cast or calcined sols, heated sols, sprayed substrates, oxidized aluminum pigment paint, insulating substrates in the form of flats, cylinders, and spheres, catalyst spheres, catalyst rods, catalyst pellets, conductors with refractory oxide coatings (sometimes taking the form of coated wires), insulators with refractory oxide coatings (such as fibers), and a wide variety of other geometrical configurations. The only limitation on the geometry of the refractory oxide is that it must be characterized as having a surface area of from 1 to 500 square meters per gram as previously described.

Figure 2:
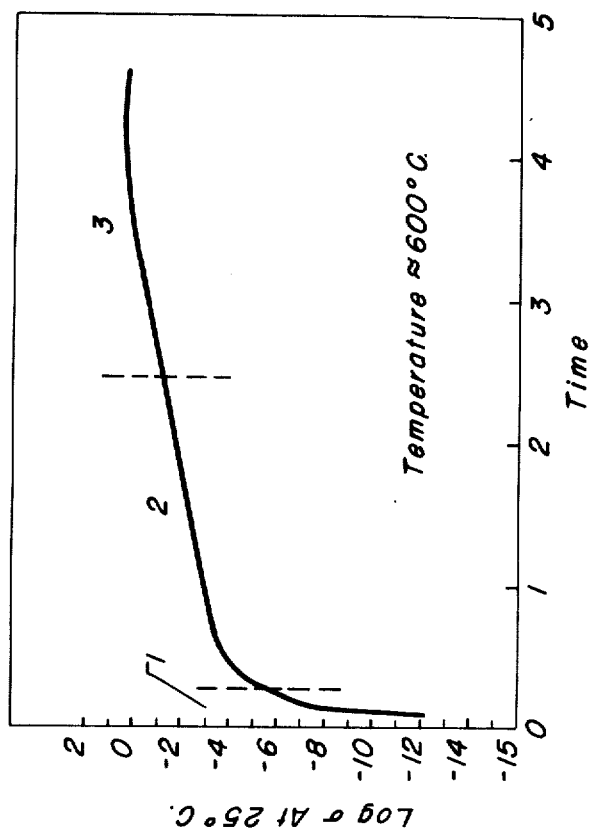
FIG. 2 is a graph of the correlation between conductivity and length of time heating the material.
Figure 1:
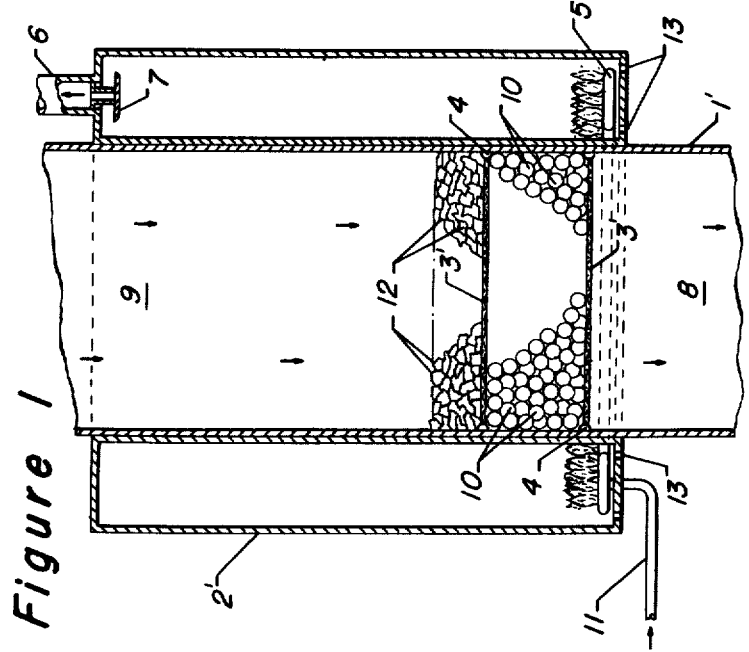
FIG. 1 of the drawing is an elevational, sectional view of apparatus used to produce the electrode material used in the electrochemical cell of this invention.

Virtually any porous refractory oxide is suitable as a basic component of the semi-conducting material for use as electrode material for an electrochemical cell. Some of the refractory oxides which have been successfully used to form the semi-conducting material include alumina ($Al_2O_3$), especially gamma-alumina, and silica-alumina ($Al_2O_3$-$SiO_2$).

A multiplicity of the refractory oxide spheres 10 used as a basic component for the semi-conducting material of this invention are held in a bed extending laterally across the quartz vessel 1' between two screens 3'. Both of the screens 3' are circumscribed by circular rims 4 which hold the screens 3' in position against the walls of quartz vessel 1'. A gas furnace 2' is positioned around quartz vessel 1' so as to heat the spheres 10 and the incoming feed upstream from the bed of refractory oxide spheres. The gas furnace 2' is positioned to form a jacket around the quartz vessel 1'. An annular gas burner ring 5 with a gas inlet 11 is positioned in the lower portion of gas furnace 2'. An exhaust port 6 allows the products of combustion to leave the gas furnace 2', while air inlets 13 supply oxygen to the burner ring 5. A baffle 7 is positioned across exhaust port 6 so that as much heat as possible is conducted inward to the quartz vessel 1'. Quartz chips 12 are positioned in the quarts vessel 1' atop the upper screen 3'. The quartz chips 12 act as a feed preheater in the vessel 1'. The gas furnace 2' is capable of producing a temperature of 1000° C. at the interior of the refractory oxide bed.

In the production of the semi-conducting material a feed stream containing a pyrolyzable substance and a carrier gas is passed downward through the refractory oxide bed from an upstream inlet 9. The organic pyrolyzable substance reacts with the refractory oxide spheres 10, laying down a carbonaceous pyropolymer thereon. The vaporized products of the reaction pass out of the quartz vessel 1' through a downstream outlet 8. The carrier gas used to carry the organic pyrolyzable substance may be any inert or reducing gas such as nitrogen or hydrogen but may not be an oxidizing gas such as oxygen.

The chemical and electrical alteration of the base or source components in the production of the semi-conducting material may be explained as follows. In the method of producing the semi-conducting material, an organic pyrolyzable substance is cracked, reformed, or polymerized upon contact with the refractory oxide at an elevated temperature. The minimum temperature necessary is 500° C. where only a refractory oxide is used and 400° C. where the refractory oxide is promoted with a catalytic metallic substance. Such substances include all metals and mixtures of metals but expecially the conventional hydrocarbon cracking catalytic metals such as platinum; platinum and rhenium; platinum and germanium; platinum and tin; platinum and lead; nickel and rhenium; tin; lead; germanium, etc. Whether or not catalytic metallic substances are preimpregnated into the refractory oxide, the refractory oxide is preferably heated to at least about 600° C. and preferably not above about 700° C. to produce the semi-conducting material of this invention. One very effective operating temperature is about 625° C.

The organic feed yields both volatile and non-volatile products. When the organic pyrolyzable substance is cyclohexane, for example, the major volatile product is usually benzene. Whatever the pyrolyzable substance, the non-volatile products remain on the hot refractory oxide as carbonaceous pyropolymers. The carbon percent of the pyropolymers by weight ranges from less than 9 to greater than 34 percent. The initial attack of the pyrolyzable substance is with active sites on the alumina surface.

The electrical conductivity of the refractory oxide and condensed pyropolymers is effected in three stages. In the first stage, the surface species of the refractory oxide react with the pyrolyzable substance to form acceptor-donor charge transfer complexes. The conductivity of the semi-conductor material at this stage will depend on the ionization potential of the donor and the electron affinity of the acceptor, as well as on changes in polarization energy due to electron rearrangements. The conductivity increases markedly over a short period of time (less than 30 seconds) in this first phase of conductivity increase, as denoted by the region 1 in the graph of FIG. 2. Within the region 1 the room temperature conductivity is still in the insulating range (less than $10^{-10}$ inverse ohm-centimeters). However, at the termination of region 1 the room temperature conductivity is within the semi-conducting range. That is, if after some critical treatment time the sample were allowed to cool to room temperature, its conductivity would not return to its original low value, but would remain permanently increased. It is at this point in time that the refractory oxide is coated with at least a monolayer of carbonaceous pyropolymers. It is interesting to note that the sample becomes quite black after it has become permanently conducting. This is in contrast to the initial white or light color of refractory oxides. The black color alone, however, does not denote a pyropolymer monolayer on the refractory oxide.

The critical treatment time when the sample becomes semi-conducting at room temperature marks the onset of region 2 as denoted in FIG. 2. This region is characterized by a relatively slower growth in the semi-conductivity, which further increases gradually two or three orders of magnitude. The color of the sample remains black.

While the increased conductivity of the material in region 1 is due to charge-transfer complexes, the increase in conductivity in region 2 results from an increase in the size of the pyropolymers with an accompanying increase in the number of conjugated double bonds. When the size of a set of conjugated double bonds in the pyropolymer on the refractory oxide becomes larger than some number (about 10 to 15 double-bond pairs), then the pyropolymer molecule acquires unusual characteristics. The energy required for the formation of the excited electron states in the molecule becomes so low that the population of electrons in excited states in thermodymamic equilibrium becomes appreciable at room temperature. This low ionization energy characteristic is dependent on the degree of conjugation in the bonds of the carbonaceous pyropolymers. The number of conjugated double bonds in the pyropolymer formed on the refractory oxide of this invention increases continuously as the refractory oxide is exposed to the organic pyrolyzable substance over a longer period of time until a critical size in the pyropolymer is reached. This particular limiting size is dependent on the choices of pyrolzable substance, treatment temperature, and ambient gas. Generally, the electrical conductivity of an organic solid rises as the degree of unsaturation increases. If unsaturation extends throughout the length of the material, the conductivity of the material is generally high. Ionization energy drops as the degree of unsaturation increases because the electrons are no longer confined to any particular location. As the ionization energy decreases, more and more electrons become available for conduction. This increases the conductivity of the coated refractory oxide material. As the pyropolymers increase in size, the molecules become large enough for a good deal of long range order to develop. The ratio of hydrogen to carbon atoms in pyropolymers resulting from hydrocarbonaceous pyrolyzable substances also decreases due to the decrease in the ratio of peripheral carbons to interior carbons as the molecular size increases. This results in increased molecular orbital overlap and a lowering of the intermolecular potential barriers to charge transport with a consequent increase in the mobility of charge carriers. This condition of the material is represented by the region 3 of FIG. 2. Within region 3 the intermolecular potential barrier to charge transport is significantly reduced, resulting in a further increase in conductivity. Within region 3, the material will turn a relatively shiny, metallic gray. The conductivity within this region will have increased one or two orders of magnitude from the conductivity of region 2. The shiny gray appearance and metallic type of conductivity characterize the semi-conducting material in the condition represented by region 3.

In summary then, the sharp initial rise in conductivity of the coated refractory oxide is likely due to carbonium ions reacting with the surface species to form thermally activated mobile charges. Formation of these charge carriers establishes an increase in the charge carrier density and results in enhanced conductivity. The quick response upon contacting a hot refractory oxide with an organic pyrolyzable substance indicates that the early increased conductivity is not due to the presence of a large quantity of pyropolymers. It follows, then, that a monolayer of carbonaceous pyropolymer molecules is not deposited on the refractory oxide surface until the material reaches the transition to region 2. It is at the commencement of region 2 that the material first becomes semi-conducting at room temperature. As the pyropolymers on the surface of the refractory oxide grow in size as well as number, free charge carriers are generated from within the pyropolymer molecules and persist even at room temperature. Continued heating in the presence of a pyrolyzable substance increases the number of free charge carriers, gradually increasing the electrical conductivity. As the material passes from region 2 to region 3, intermolecular potential barriers to charge transport are lowered and both the mobility and the number of charge carriers is increased. In developing a semi-conducting material with a given refractory oxide the conditions and reacting organic pyrolyzable substance can be varied so that different types of polymers exhibiting a variety of properties are formed. Pyrolyzation of this invention differs from conventional pyrolyzation in requiring a refractory oxide as a basic component. The refractory oxide serves the dual role of catalyzing the formation of the semi-conducting pyropolymer from the organic pyrolyzable substance and providing for the establishment of donor-acceptor charge-transfer complexes.

Another electrical property that may be affected by the manner in which the semi-conducting material of this invention is produced is the conductivity type. It has been observed that treating the carbonaceous pyropolymers at different temperatures results in different conductivity types for the same base material. Preimpregnating the refractory oxide with the proper inorganic salt causes the conductivity type of the completed semi-conducting material to be n-type, whereas reacting the refractory oxide alone with most organic pyrolyzable substance will result in a semi-conducting material that has p-type conductivity. One exception to the general rule that p-type conductivity is achieved where a refractory oxide alone is used is in a case where the organic pyrolyzable substance is benzene at 750° C. A semi-conducting material is produced from the reaction of benzene and a refractory oxide at 750° C. will yield a semi-conducting material that is n-type.

Figure 3:
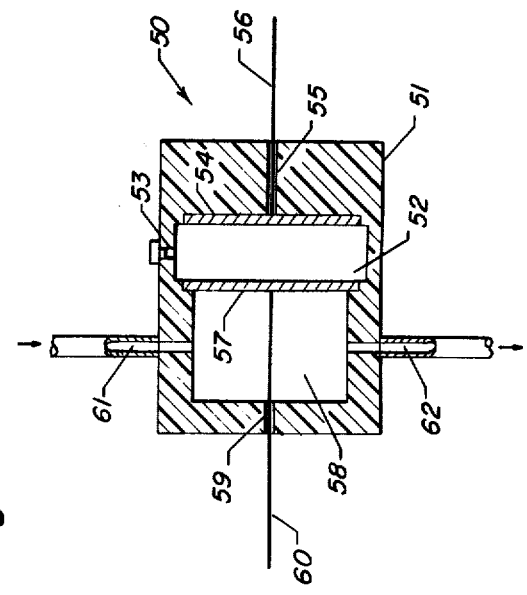
FIG. 3 is a schematical elevational view of a zinc-air electro-chemical cell constructed according to this invention.

Reference is now made to FIG. 3 of the drawing where a schematical sectional view of a zinc-air electrochemical cell is shown. The cell 50 is comprised of a housing 51 formed of a suitable insulating material such as plexiglas and has openings 55 and 59 for insertion of conducing wire leads 56 and 60 respectively. The housing has a central hollow portion 52 forming a containment well for the electrolyte. A plugged opening 53 is used to fill well 52 with the electrolyte material which may be a sodium hydroxide or ammonium chloride solution by way of example. A zinc anode 54 is cemented to one interior wall of the containment well 52. Preferably the zinc anode is amalgamated with mercuric chloride to prevent polarization.

Also formed within the housing 51 is an air well 58 with communicating air inlet 61 formed on the top portion of the housing and a communicating air vent 62 formed on the lower portion of the housing. Thus, air can be readily furnished to well 58 and any excess vented through opening 62. A cathode 57 is placed between the electrolyte well 52 and the air well 58. The cathode is of a material made in accordance with the general principles taught hereinbefore and is structured in this case as a typical gas diffusion electrode. Cathode 57 is comprised of a refractory oxide having a surface area from 1 to 500 square meters/gram and a carbonaceous pyropolymer forming at least a monolayer on the refractory oxide. The resulting electrode has a conductivity at room temperature of from about $10^{-8}$ to $10^0$ inverse ohm-centimeters. Both the zinc and air electrodes can be connected to an external electrical circuit via leads 56 and 60 respectively.

The structural details of a particular electrode are not considered within the scope of the present invention. However, one procedure of forming the electrode is comprised of pressing or compacting a powdered form of the base catalytic material of this invention into the desired electrode shape. A conducting screen may be embedded into the electrode so as to provide for a charge collector. On the other hand, conducting material may be sprayed onto the surface of the electrode to form the charge collector. Specific properties of a gas diffusion electrode may be obtained by incorporating a hydrophobic material such as Teflon into the electrode compact or by spraying the electrode face exposed to the gas with such material or by any other suitable means. Another example of forming the electrode is by depositing the catalytic base material of this invention on a solid expanse of material such as a porous metal, plastic or ceramic.

Figure 4:
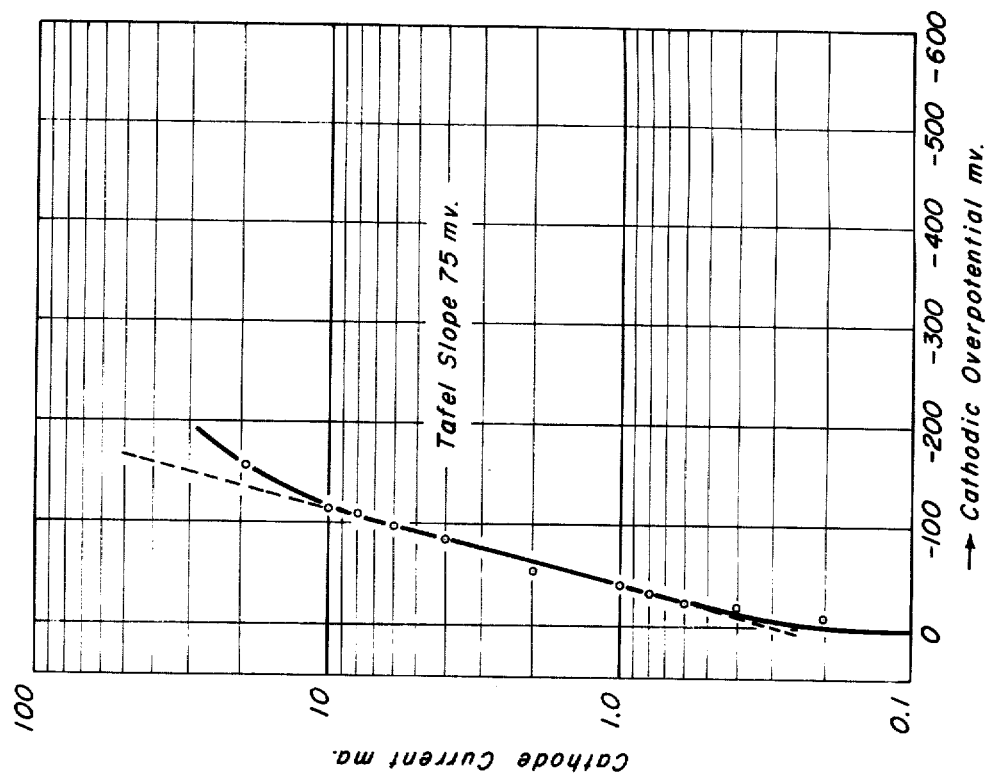
FIG. 4 is a polarization curve for a zinc-air cell having the semi-conducting electrode material of this invention embodied therein.

FIG. 4 represents a polarization curve for a zinc-air cell having the semi-conducting material of this invention embodied therein.

The semi-conducting electrode was manufactured according to the following procedure: Alumina catalysts containing 0.75 percent Pt was finely ground and pressed into 1 inch diameter discs about 1 mm in thickness. The pressure used in this operation was 19,000 psi. The pressure was applied only as long as it took to attain it, about 30 seconds. Subsequently the discs were reduced in a hydrogen atmosphere at 600° C. for 2 hours. After that time hydrogen was replaced by nitrogen, and the latter was bubbled through cyclohexane at room temperature. Again the sample was left in this environment at 650° C. for 2 to 3 hours. Cooling took place in pure nitrogen.

The electrode disc was then placed on the cathode side of a cell similar to that shown in FIG. 3. The anode of the cell was lightly amalgamated zinc. The electrolyte was 10 percent sodium hydroxide as is most commonly used in air depolarized zinc batteries.

This cell was discharged such that the cathode potential current characteristic was recorded under potential controlled conditions. The reference electrode used for this purpose was mercury/mercuric oxide immersed in the same electrolyte, 10 percent sodium hydroxide. The cathode potential was controlled by means of potentiostate. The polarization curve in FIG. 4 was corrected for the internal resistance of the semi-conducting electrode and clearly indicates catalytic activity by virtue of the low Tafel slope and theoretical open circuit potential.

In another case a gas diffusion electrode was manufactured by compacting 80 percent by weight semi-conducting alumina and a powder containing 0.75 percent Pt with 20 percent by weight Teflon powder onto a platinum wire screen to form an electrode composite disc of 1 inch diameter. During operation of this electrode in the manner described above, cathode currents of up to 100 milliamps/cm$^2$ were obtained at polarization below 200 millivolts again measured free of any IR drop.

The use of the catalytic base material of this invention should not be limited to a gas diffusion type electrode. For example, a classical electrode of the immersed type may be formed imcorporating the base material. Here, the reactive component is a dissolved gas or other form of depolarizer, the electrode is immersed in the electrolyte.

I claim as my invention:

1. In an electrochemical cell, an electrode therefor comprising a refractory oxide having a surface area from 1 to 500 square meters per gram, and a carbonaceous pyropolymer forming at least a monolayer on said refractory oxide, said electrode having a conductivity at room temperature of from $10^{-8}$ to $10^0$ inverse ohm-centimeters.

2. The electrochemical cell of claim 1 wherein said refractory oxide is alumina.

3. The electrochemical cell of claim 2 wherein said refractory oxide is gamma-alumina.

4. The electrochemical cell of claim 1 wherein said refractory oxide is silica-alumina.

5. The electrochemical cell of claim 1 wherein said refractory oxide is preimpregnated with a metal.

6. The electrochemical cell of claim 5 wherein said metal is platinum.

7. The electrochemical cell of claim 5 wherein said refractory oxide is preimpregnated with a plurality of metals.

8. The electrochemical cell of claim 7 wherein said metals are platinum and rhenium.

9. The electrochemical cell of claim 7 wherein said metals are platinum and germanium.

10. The electrochemical cell of claim 7 wherein said metals are platinum and tin.

11. The electrochemical cell of claim 7 wherein said metals are platinum and lead.

12. The electrochemical cell of claim 7 wherein said metals are platinum, nickel and rhenium.

13. The electrochemical cell of claim 1 wherein said refractory oxide is preimpregnated with an inorganic salt.

14. The electrochemical cell of claim 13 wherein said inorganic salt is sodium chloride.

15. The electrochemical cell of claim 1 wherein said electrode forms the cathode of said cell.

16. The electrochemical cell of claim 15 wherein said electrode forms the anode of said cell.

* * * * *